United States Patent
Park

(10) Patent No.: US 9,025,502 B2
(45) Date of Patent: May 5, 2015

(54) MOBILE COMMUNICATION SYSTEM AND METHOD FOR TRANSMITTING/RECEIVING SIGNAL THEREOF

(75) Inventor: Sungryong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 13/589,479

(22) Filed: Aug. 20, 2012

(65) Prior Publication Data

US 2013/0044649 A1 Feb. 21, 2013

(30) Foreign Application Priority Data

Aug. 19, 2011 (KR) .................. 10-2011-0082955

(51) Int. Cl.
| | | |
|---|---|---|
| *H04J 1/00* | (2006.01) | |
| *H04B 7/204* | (2006.01) | |
| *H04B 1/04* | (2006.01) | |
| *H04B 7/04* | (2006.01) | |

(52) U.S. Cl.
CPC ................ *H04B 1/04* (2013.01); *H04B 7/0413* (2013.01)

(58) Field of Classification Search
CPC ............ H04B 1/005; H04B 1/02; H04B 1/68; H04B 7/0413; H04B 7/12; H04B 7/17
USPC ......... 370/329, 330, 280, 276, 281, 290, 294, 370/295, 203–210; 455/77, 73, 82, 84, 87, 455/431, 204, 76, 115, 78, 86, 225, 71, 114, 455/553, 552, 426, 103; 324/233, 230, 229, 324/231, 236
See application file for complete search history.

(56) References Cited

U.S. PATENT DOCUMENTS

| | | | | |
|---|---|---|---|---|
| 6,201,391 | B1* | 3/2001 | Burkhardt et al. ............ | 324/233 |
| 6,216,012 | B1* | 4/2001 | Jensen ........................ | 455/553.1 |
| 6,973,139 | B2* | 12/2005 | Ahn et al. ...................... | 375/297 |
| 8,452,241 | B2* | 5/2013 | Haralabidis et al. ............ | 455/77 |
| 2010/0291888 | A1* | 11/2010 | Hadjichristos et al. ..... | 455/127.4 |
| 2013/0200948 | A1* | 8/2013 | Lee et al. ......................... | 330/10 |

* cited by examiner

*Primary Examiner* — Hanh N Nguyen

(74) *Attorney, Agent, or Firm* — Jefferson IP Law, LLP

(57) ABSTRACT

A method of transmitting a signal in a base station is provided. The method includes filtering a signal to be transmitted through a filter, power amplifying the filtered signal to generate nonlinear harmonic components corresponding to a first frequency band and a second frequency band, separating the nonlinear harmonic components according to the first frequency band and the second frequency band such that nonlinear harmonic components corresponding to the first frequency band passes through a first frequency band duplexer and nonlinear harmonic components corresponding to the second frequency band passes through a second frequency band duplexer, and transmitting the separated nonlinear harmonic components.

6 Claims, 7 Drawing Sheets

MOBILE COMMUNICATION SYSTEM AND METHOD FOR TRANSMITTING/RECEIVING SIGNAL THEREOF

PRIORITY

This application claims the benefit under 35 U.S.C. §119 (a) of a Korean patent application filed on Aug. 19, 2011 in the Korean Intellectual Property Office and assigned Serial No. 10-2011-0082955, the entire disclosure of which is hereby incorporated by reference.

BACKGROUND OF THE INVENTION

1. Field of the Invention

The present invention relates to a mobile communication system and a method for implementing a Multi-Input Multi-Output (MIMO) transmission method in the mobile communication system. More particularly, the present invention relates to a method for implementing an MIMO transmission in a mobile communication system by configuring a transmitter, a transmitter antenna, and a receiver antenna into a single device.

2. Description of the Related Art

A Multi-Input Multi-Output (MIMO) transmission method refers to a smart antenna technique for increasing a wireless communication capacity. Specifically, MIMO transmission methods use multiple antennas on a base station and a terminal. Further, according to MIMI transmission methods, wireless communication capacity is increased in proportion to the number of antennas employed. Generally, in the MIMO transmission method, the base station indicates a transmission terminal and the terminal indicates a receiver terminal. When M number of antennas are installed in the base station and N number of antennas are installed in the terminal in order to implement an MIMO technology, an average transmission capacity of data transmission is increased by min(M, N).

In a mobile communication system, removal of spatial interference is important in order to allow effective dynamic frequency allocation between cells. Also, a spatial interference processing between Access Points (APs) is important due to an increase in a number of APs communicating in mobile communication systems. A method for spatial interference processing may include a method of dynamically or position adaptively decreasing a frequency recycle ratio. However, such method causes a loss of a frequency resource. When using the MIMO transmission method for the spatial interference processing, data can be transmitted without frequency loss.

FIG. 1 illustrates a configuration of a base station for transmitting data in a communication system using a MIMO transmission method according to the related art. Herein, it is assumed that the base station uses the MIMO transmission method to transmit and receive a signal through two antennas.

Referring to FIG. 1, a signal transmission path in the base station is described.

A signal processing unit 110 generates signals based on data to be transmitted through each antenna and simultaneously transmits the signals to respective filters 113, 123, 133, and 143. First, a signal processing path through an antenna 1, 119, will be described.

A signal corresponding to data to be transmitted is passed to the first filter 113 through the signal processing unit 110. The first filter 113 transmits a signal to be transmitted to a first pulse amplitude modulator 115. The first pulse amplitude modulator 115 amplifies the signal at a maximum power so that, when the signal is emitted from the antenna, an electromagnetic wave corresponding to the signal may reach a desired destination. A duplexer 117 passes only a signal to be transmitted through the antenna such that the signal is emitted through the antenna 1, 119.

A path in which a signal transmitted from a terminal is received by the base station through the antenna 1, 119, is described. A signal received through the antenna 1, 119, passes through the first duplexer 117 to be transmitted to a low noise amplifier 120. A signal amplified by the low noise amplifier 120 is filtered by the filter 123 and is transmitted to the signal processing unit 110.

A signal transmitting and receiving path through an antenna 2, 139, is configured substantially the same as a signal transmitting and receiving path through the antenna 1, 119. However, a difference exists in the filters 113, 123, 133, and 143, the pulse amplitude modulators 115 and 135, the duplexers 117 and 137, and the low noise amplifiers 120 and 140 of the base station that are respectively provided for each antenna and for each transmission and receiving means.

The signal processing unit 110 process signals received through the antenna 1, 119, and the antenna 2, 139, to generate one datum.

FIG. 2 illustrates a method of transmitting a signal in a communication system using a MIMO transmission method according to the related art.

Referring to FIG. 2, a signal transmitted through a transmitter antenna 1, 210a, is transmitted to a receiver antenna 1, 230a and to a receiver antenna 2, 230b. Also, a signal transmitted through a transmitter antenna 2, 210b, is transmitted to the receiver antenna 1, 230a, and to the receiver antenna 2, 230b.

However, in base stations using MIMI transmission methods according to the related art, respective base stations and terminals need to be configured with a plurality of antennas, thus being subject to spatial limitations. Also, configuring the respective base stations and terminals to include the plurality of the antennas incurs a high cost.

Therefore, a need exists for a system and method for implementing an MIMO transmission in a mobile communication system by configuring a transmitter, a transmitter antenna, and a receiver antenna into a single device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a mobile communication system and a method of implementing a Multi-Input Multi-Output (MIMO) transmission method in the mobile communication system, in which a transmission terminal, an antenna of the transmission terminal and an antenna of a receiver terminal are implemented as a single device by using a nonlinear characteristic of an active device.

In accordance with an aspect of the present invention, a method of transmitting a signal in a base station is provided. The method includes filtering a signal to be transmitted through a filter, power amplifying the filtered signal to generate nonlinear harmonic components corresponding to a first frequency band and a second frequency band, separating the nonlinear harmonic components according to the first frequency band and the second frequency band such that nonlinear harmonic components corresponding to the first frequency band passes through a first frequency band duplexer and nonlinear harmonic components corresponding to the second frequency band passes through a second frequency band duplexer, and transmitting the separated nonlinear harmonic components.

In accordance with another aspect of the present invention, a method of receiving a signal in a terminal is provided. The method includes receiving a signal through an antenna, separating the received signal according to each corresponding frequency band by a first frequency band duplexer and a second frequency band duplexer, amplifying the separated signal to be filtered, and processing the filtered signal into data.

In accordance with another aspect of the present invention, a base station for transmitting a signal is provided. The base station includes a transmission filter configured to filter a signal to be transmitted by a signal processing unit, a nonlinear harmonic component generator configured to power amplify the filtered signal to generate nonlinear harmonic components corresponding to a first frequency band and a second frequency band, a first frequency band duplexer and a second frequency band duplexer configured to separate the nonlinear harmonic components into the first frequency band and the second frequency band, and an antenna configured to transmit the separated nonlinear harmonic components.

In accordance with another aspect of the present invention, a terminal for receiving a signal is provided. The terminal includes an antenna configured to receive a signal provided from a base station, a first frequency band duplexer and a second frequency band duplexer configured to separate the received signal into a first frequency band and a second frequency band, and a signal processing unit configured to amplify the separated signal to be filtered and to process the filtered signal into data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more clearly understood from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
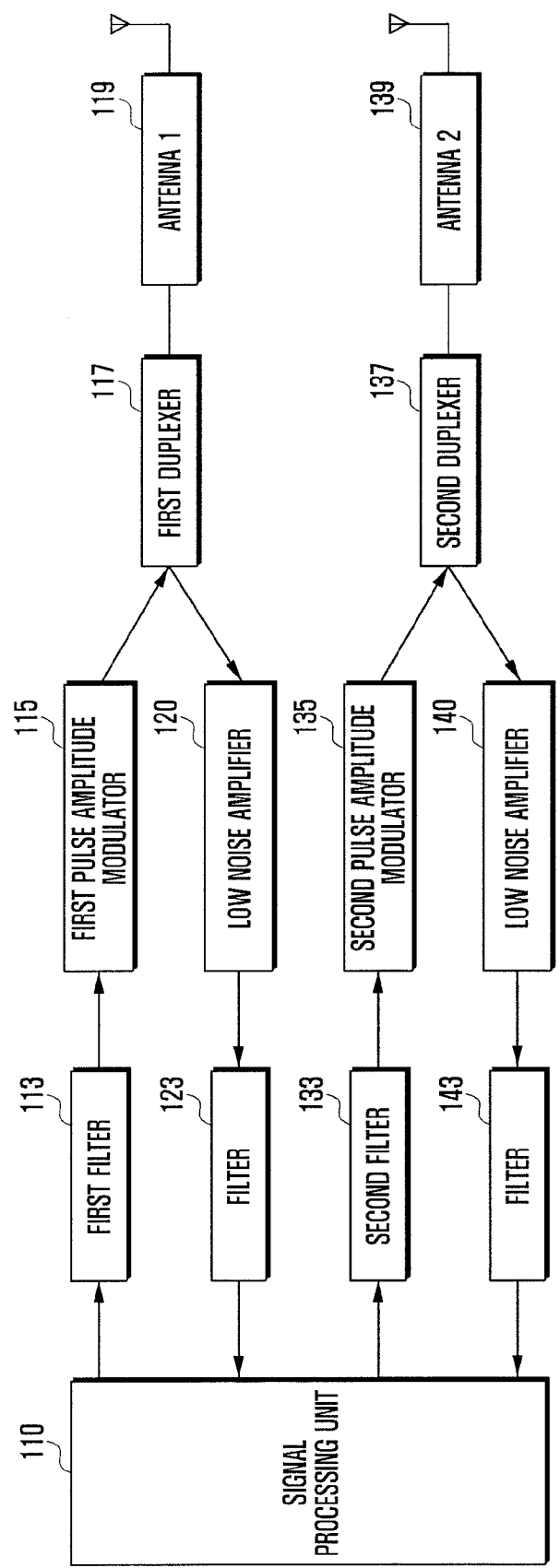
FIG. 1 illustrates a configuration of a base station for transmitting data in a communication system using a MIMO transmission method according to the related art.
Figure 2:
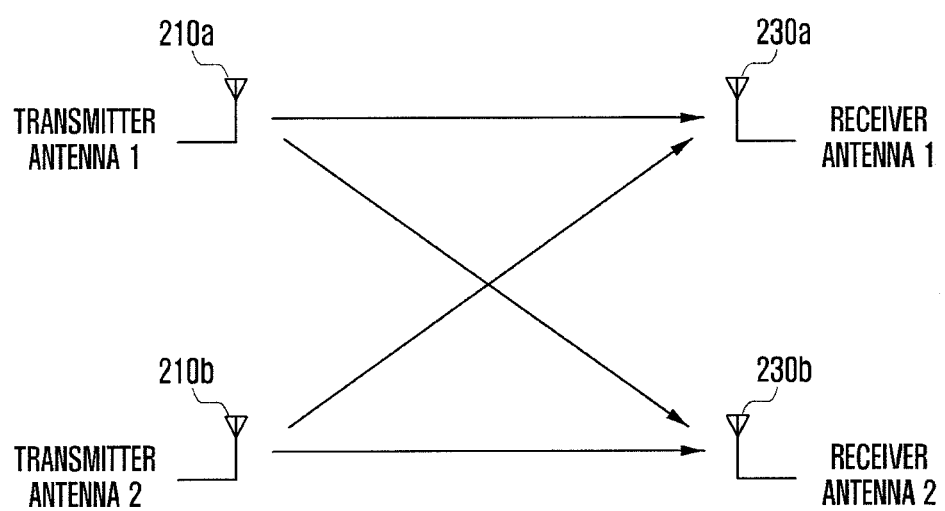
FIG. 2 illustrates a method of transmitting a signal in a communication system using a MIMO transmission method according to the related art.
Figure 3:
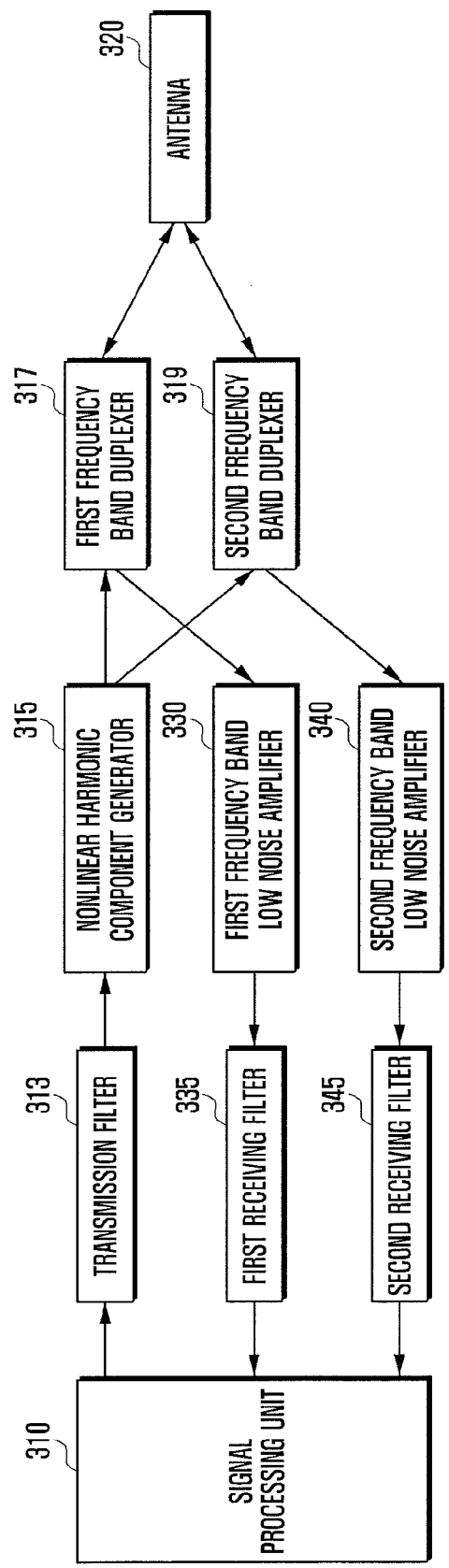
FIG. 3 illustrates a configuration of a signal processing path of a signal transmitted to and received from a base station according to an exemplary embodiment of the present invention.

FIG. 3 illustrates a configuration of a signal processing path of a signal transmitted to and received from a base station according to an exemplary embodiment of the present invention.

Referring to FIG. 3, a base station includes a signal processing unit 310, a transmission filter 313, a nonlinear harmonic generator 315, a first frequency band duplexer 317, a second frequency band duplexer 319, an antenna 320, a first frequency band low noise amplifier 330, a first receiving filter 335, a second frequency band low noise amplifier 340, and a second receiving filter 345.

When data to be transmitted from the base station is inputted, the signal processing unit 310 generates a signal based on the input data. Also, the signal processing unit 310 may generate data based on a signal received in each frequency band.

The transmission filter 313 passes only a desired signal among signals generated by the signal processing unit 310 while attenuating the remaining signals.

The nonlinear harmonic generator 315 generates a nonlinear harmonic component by amplifying the signal passing through the transmission filter 313. In order for an electromagnetic wave corresponding to a signal emitted from the antenna 320 to reach a desired destination, the signal needs to be amplified at an appropriate power. Thus, in order to deliver a signal to the desired destination, a power level at which the signal is amplified at a final stage is important in a communication system. Therefore, the nonlinear harmonic generator 315 includes a pulse amplitude modulator.

The pulse amplitude modulator amplifies the filtered signal to be transmitted. To this end, the pulse amplitude modulator maintains a constant width and period of the signal, and modifies only an amplitude of the signal depending on a signal wave. Namely, the pulse width modulator can transform a sampled value into a pulse that is proportional to the amplitude of the signal and transmit the converted pulse. Therefore, a signal passing through the pulse width modulator (i.e., a sample pulse generated according to the amplitude of the signal) has a height corresponding to an amplitude of an original signal.

According to exemplary embodiments of the present invention, the pulse amplitude modulator may modulate a frequency signal that passes through the transmission filter 313 into signal components corresponding to at least two frequency bands by using a nonlinear harmonic component generated due to a nonlinear device characteristic thereof. Specifically, a nonlinear circuit device is used for the pulse amplitude modulator. According to exemplary embodiments of the present invention, in the nonlinear circuit device, input and output current and voltage characteristics have a nonlinear character.

The nonlinear character of the input and output current and voltage characteristics refers to a state in which a current and a voltage are not proportional to each other. Thus, when a signal filtered by the transmission filter 313 passes through the pulse amplitude modulator corresponding to the nonlinear device, the signal is modulated to a nonlinear harmonic component in which the current and the voltage are not proportional to each other. Here, the harmonic component refers to an electromagnetic radiation having a high frequency and refers to a multiple frequency of an original source frequency. According to exemplary embodiments of the present invention, by using the nonlinear harmonic component generated in the pulse amplitude modulator, an effect of transmitting a signal through the antenna 320 may have an equal effect of transmitting a signal according to a Multi-Input Multi-Output (MIMO) method. The nonlinear harmonic component generated in the pulse amplitude modulator will be described later with reference to FIG. 4.

The first frequency band duplexer 317 and the second frequency band duplexer 319 separate a signal component that belongs to a corresponding frequency band from the nonlinear harmonic component and respectively transmit the corresponding separated signal components the antenna 320. In other words, the first frequency band duplexer 317 transmits only a signal component of a first frequency band to the antenna 320, and the second frequency band duplexer 319 transmits only a signal component of a second frequency band to the antenna 320. According to exemplary embodiments of the present invention, frequencies of respective frequency bands are simultaneously transmitted to the antenna 320.

The first frequency band duplexer 317 and the second frequency band duplexer 319 will be collectively referred to as a duplexer for explanation purposes. The duplexer performs to connect a transmitter terminal and a receiver terminal of the antenna. In other words, while using the same antenna, the transmitter terminal for transmitting a signal and the receiver terminal for receiving a signal are separately provided. If the transmitter terminal and the receiver terminal use a different frequency and use a different antenna in such a case, a duplexer is not needed. However, in most communications systems, a transmission frequency band and a receiving frequency band are often similar. Namely, instead of using two antennas, one antenna may be used to transmit and receive a signal. In this case, the duplexer is needed in order to efficiently share the antenna. To this end, the duplexer uses a band passing filter for passing only the transmission frequency and a band passing filter for passing only a receiving frequency. Accordingly, in the present invention, the first frequency band duplexer 317 and the second frequency band duplexer 319 are provided in order to respectively separate a harmonic component of a first frequency band and a harmonic component of a second frequency band from the generated nonlinear harmonic component.

In addition, the first frequency band duplexer 317 and the second frequency band duplexer 319 separate a signal component corresponding to each frequency band from a signal received by the antenna 320. For example, the signal component corresponding to the first frequency band and the signal component corresponding to the second frequency band are in a multiple-factor relationship.

The antenna 320 transmits the signal component transmitted from the first frequency band duplexer 317 and the second frequency band duplexer 319 to a terminal. According to exemplary embodiments of the present invention, in order to transmit the signal component corresponding to the first frequency band and the signal component corresponding to the second frequency band, the antenna 320 has a dual frequency band component characteristic. In addition, the antenna 320 receives a signal transmitted from the terminal. Also, the antenna 320 transmits the received signal to the first frequency band duplexer 317 and the second frequency band duplexer 319.

The first frequency band low noise amplifier 330 and the second frequency band low noise amplifier 340 respectively amplify a signal separated by the first frequency band duplexer 317 and the second frequency band duplexer 319. The first frequency band low noise amplifier 330 and the second frequency band low noise amplifier 340 are collectively referred to as a low noise amplifier for explanation purposes.

As an example, the low noise amplifier amplifies a weak signal received by the antenna 320. Specifically, a signal received through the antenna 320 has a very low power level due to an influence of attenuation and noise. Therefore, amplification of the received signal is necessary. Further, because the received signal includes a significant amount of outside noise, the low noise amplifiers needs to amplify the signal while maintaining a minimum amount or level of noise. For example, according to exemplary embodiments of the present invention, the low noise amplifier is an amplifier in which an operating point and a matching point are designed to have a low noise figure, and is usually required to have a noise figure between 1.5 and 2.5.

A signal transmitted from the respective frequency duplexers 317 and 319 is amplified by the low noise amplifiers 330 and 340 and transmitted to the receiving filters 335 and 345 of each corresponding frequency band.

The first receiving filter 335 and the second receive filter 345 filter only a desired signal component from the signal transmitted from the first frequency band low noise amplifier 330 and the second frequency band low noise amplifier 340 and respectively transmit the filtered signal component to the signal processing unit 310.

According to exemplary embodiments of the present invention, a base station having the above described configuration may generate a signal corresponding to at least two frequency bands by using one filter and one pulse amplitude modulator. For example, the signal generated in the above manner may be separated according to a frequency band thereof by a duplexer provided for each frequency band and the signal separated for each frequency band may be transmitted through the antenna 320.

Figure 4:
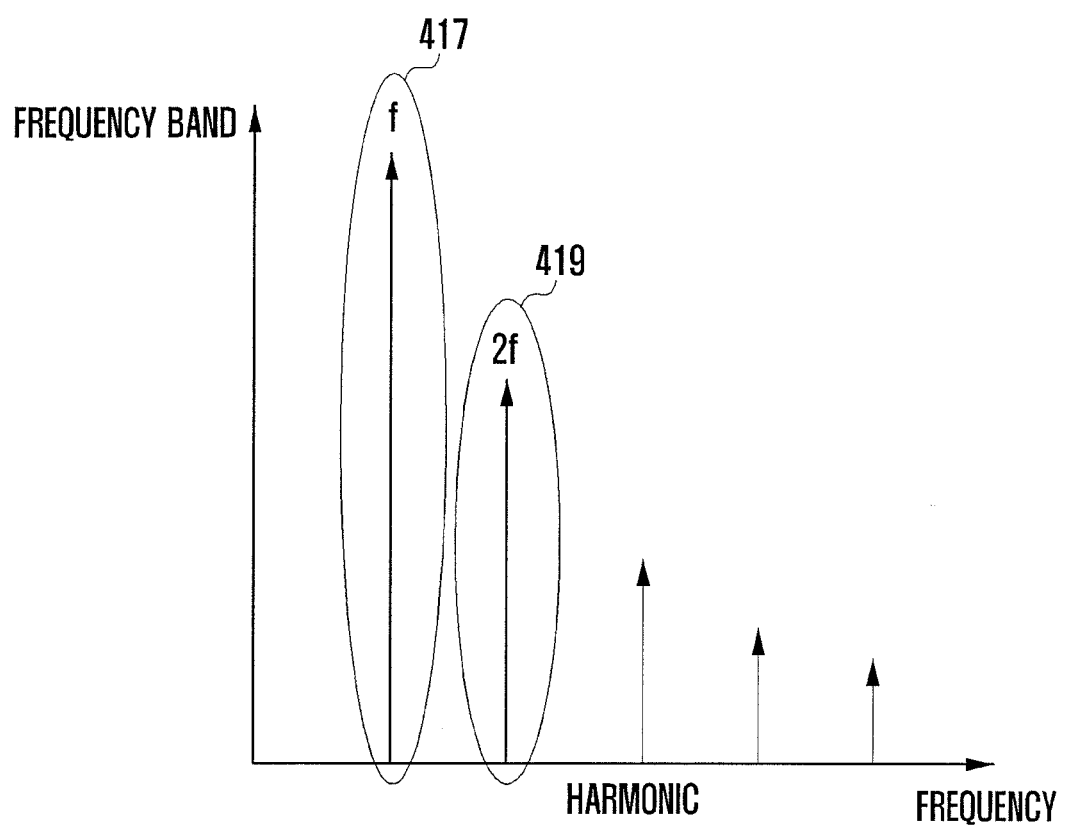
FIG. 4 illustrates a signal component generated according to an exemplary embodiment of the present invention.

FIG. 4 illustrates a signal component generated according to an exemplary embodiment of the present invention.

Referring to FIG. 4, the pulse amplitude modulator has the nonlinear device characteristic, as described above. By using the nonlinear device characteristic, the pulse amplitude modulator may modulate the signal passing through the filter into a nonlinear harmonic component. Here, the harmonic component refers to an electromagnetic radiation of a high frequency and refers to a multiple frequency of an original source frequency.

As shown in FIG. 4, the nonlinear harmonic component generated by the pulse amplitude modulator each has a different frequency band. According to the related art, only a harmonic component of a highest frequency band among nonlinear harmonic components generated by the pulse amplitude modulator is used. In contrast, according to exemplary embodiments of the present invention, harmonic components of at least two frequency bands are used. In other words, a nonlinear harmonic component f, 417, in a highest frequency band and a nonlinear harmonic component 2f, 419, in a second highest frequency band may be used for data transmission. Here, the nonlinear harmonic component f, 417, in the highest frequency band and the nonlinear harmonic component 2f, 419, in the second highest frequency band are in a multiple-factor relationship.

The nonlinear harmonic component f, 417, in the highest frequency band and the nonlinear harmonic component 2f, 419, in the second highest frequency are respectively transmitted to the first frequency band duplexer and the second frequency band duplexer. Then, the first frequency band duplexer separates only the nonlinear harmonic component f, 417, in the highest frequency band and the second frequency band duplexer separates only the nonlinear harmonic component 2f, 419, in the second highest frequency band to be transmitted to the antenna. The antenna first transmits the nonlinear harmonic component transmitted from the first frequency band duplexer and then transmits the nonlinear harmonic component transmitted from the second frequency band duplexer Thus, through a process of separating nonlinear harmonic components according to the frequency band thereof and subsequently transmitting the separated nonlinear harmonic components, exemplary embodiments of the present invention provide the same effect as a Multi-Input Multi-Output (MIMO) transmission method. According to MIMO transmission methods according to the related art, a signal is generated by using at least two filters and two pulse amplitude modulators provided in correspondence with an antenna to which each signal is transmitted, and the generated signal passes through a corresponding duplexer before being sent to the corresponding antenna. However, according to exemplary embodiments of the present invention, the nonlinear harmonic components in at least two frequency bands generated through one filter and one pulse amplitude modulator may be simultaneously transmitted to a single antenna. In other words, through a process of simultaneously transmitting the nonlinear harmonic components, an effect of transmitting a signal corresponding to each antenna by using a signal component in a different frequency band in the MIMO transmission method according to the related art may be provided.

Figure 5:
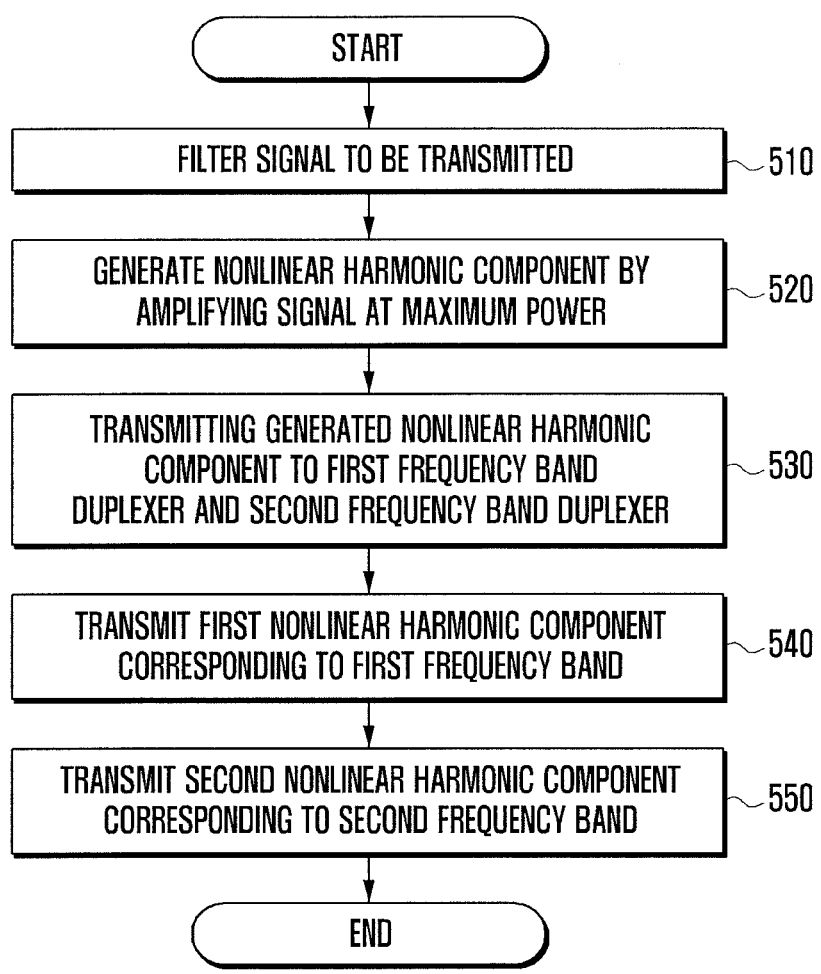
FIG. 5 illustrates a signal transmission method according to an exemplary embodiment of the present invention.

FIG. 5 illustrates a signal transmission method according to an exemplary embodiment of the present invention.

Referring to FIG. 5, the base station filters a signal to be transmitted through the transmission filter at step 510. Also, the base station amplifies the filtered signal through a nonlinear harmonic component generator at step 520. For example, the nonlinear harmonic component generator is the pulse amplitude modulator. According to exemplary embodiments of the present invention, the base station may amplify the filtered signal through the nonlinear harmonic component generator at a maximum power. Here, when the signal is power amplified, nonlinear harmonic components corresponding to the first frequency band and the second frequency band are generated.

Next, the base station transmits the generated nonlinear harmonic components to the first frequency band duplexer and the second frequency band duplexer at step 530. According to exemplary embodiments of the present invention, the base station may transmit the generated nonlinear harmonic components to the first frequency band duplexer and the second frequency band duplexer at the same time. Each duplexer (e.g., the first frequency band duplexer and the second frequency band duplexer) then respectively passes only a nonlinear harmonic component of a corresponding frequency band. Namely, the first duplexer passes a first nonlinear harmonic component corresponding to a first frequency band, and the second duplexer passes a second nonlinear harmonic component corresponding to a second frequency band. Here, a signal component corresponding to the first frequency band and a signal component of the second frequency band are in a multiple-factor relationship.

Next, the base station transmits the first nonlinear harmonic component corresponding to the first frequency band at step 540. Next, the base station transmits the second nonlinear harmonic component corresponding to the second frequency band at step 550. According to exemplary embodiments of the present invention, the base station may transmit a signal in at least one frequency band through one antenna. Therefore, the base station first transmits a signal component in the first frequency band passing through the first frequency band duplexer to the antenna. Next, the base station transmits a signal component in the second frequency band passing through the second frequency band duplexer to the antenna. In other words, the base station transmits signal components corresponding to respective frequency bands passing through each frequency band duplexer to the antenna all together.

A method of receiving a signal transmitted from the base station to the terminal is described below. A signal received through one antenna is separated into signal components corresponding to each frequency band through the first frequency band duplexer and the second frequency band duplexer. Each separated signal component passes through the first frequency band low noise amplifier and the second frequency band low noise amplifier and is transmitted to each corresponding receiving filter. Each corresponding receiving filter filters only a desired signal component, and the signal component filtered by the each corresponding receiving filter is generated into data in the signal processing unit.

In the above, a method of transmitting a signal using the nonlinear harmonic component and processing a signal received from the terminal in the base station is described. Next, a configuration and a method for transmitting and receiving a signal in the terminal are described.

Figure 6:
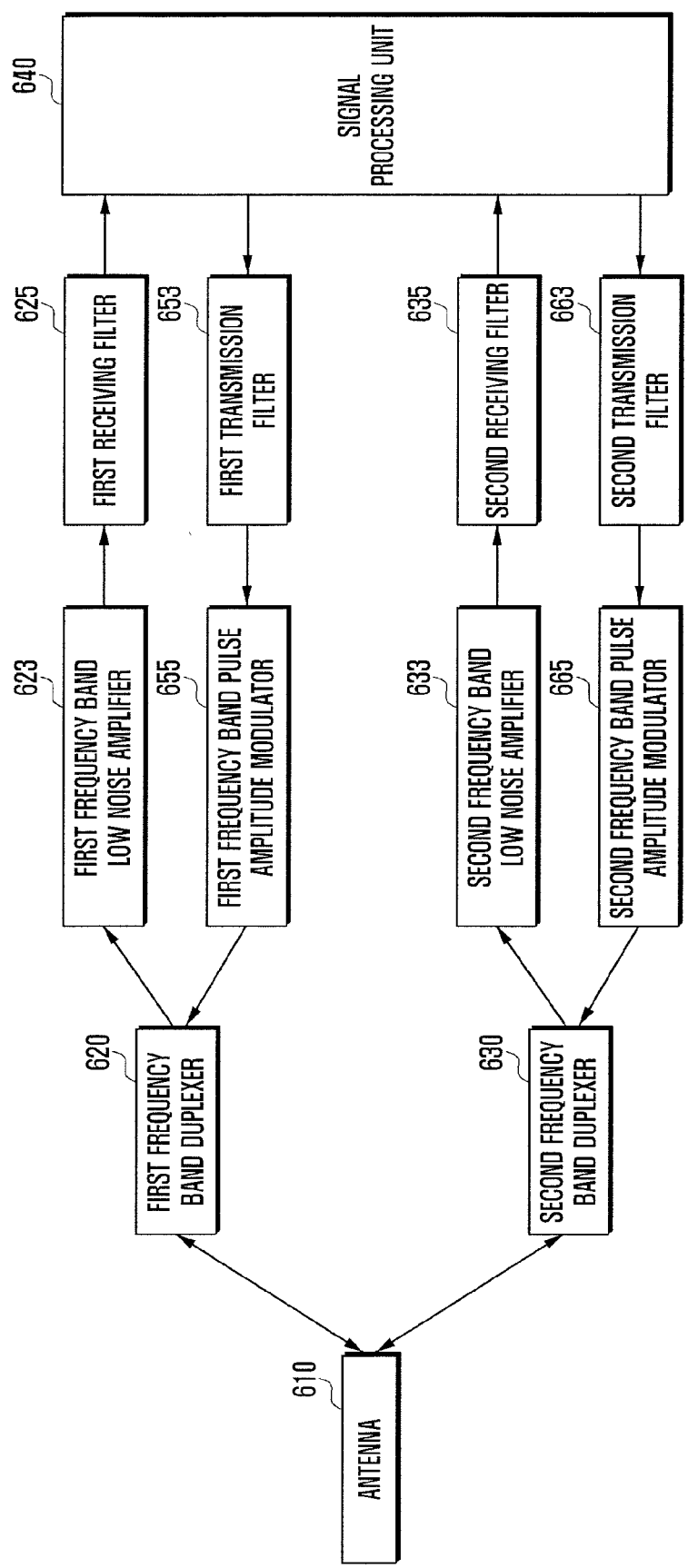
FIG. 6 illustrates a configuration of a signal processing of a signal transmitted to and received from a terminal according to an exemplary embodiment of the present invention.

FIG. 6 illustrates a configuration of a signal processing of a signal transmitted to and received from a terminal according to an exemplary embodiment of the present invention.

Referring to FIG. 6, an antenna 610 receives a signal transmitted from the base station. The antenna 610 transmits the received signal to a first frequency band duplexer 620 and a second frequency band duplexer 630. Here, the antenna 610 has a dual frequency band component characteristic.

The first frequency band duplexer 620 and the second frequency band duplexer 630 respectively connect a transmitter terminal of the antenna and a receiver terminal of the antenna. In other words, while using the same antenna, the transmitter terminal for transmitting a signal and the receiver terminal for receiving a signal are separately provided. For example, according to exemplary embodiments of the present invention, the first frequency band duplexer 620 and the second frequency band duplexer 630 use a band passing filter for passing only a transmission frequency and a band passing filter for passing only a receiving frequency. By using the above feature, the first frequency band duplexer 620 and the second frequency band duplexer 630 respectively separate a signal component corresponding to a corresponding frequency band from the signal received from the antenna 610. Here, the signal component corresponding to the first frequency band and the signal component corresponding to the second frequency band are in a multiple-factor relationship.

A first frequency band low noise amplifier 623 and a second frequency band low noise amplifier 633 amplify a signal separated by the first frequency band duplexer 620 and the second frequency band duplexer 630. The first frequency band low noise amplifier 623 and the second frequency band low noise amplifier 633 will be collectively referred to as a low noise amplifier for explanation purposes.

The low noise amplifier performs to amplify a weak signal received by the antenna 610. Specifically, a signal received through the antenna 610 has a very low power level due to an influence of attenuation and noise. Further, the signal received through the antenna 610 includes a significant amount of outside noise. Therefore, the low noise amplifiers need to amplify the signal while maintaining a minimum noise. Accordingly, the signal transmitted from each of the frequency band duplexers 620 and 630 are amplified by each of the frequency band low noise amplifiers 623 and 633 and are transmitted to receiving filter 625 and 635.

The first receiving filter 625 and the second receiving filter 635 filter only a desired signal component from the signal transmitted from the first frequency band low noise amplifier 623 and the second frequency band low noise amplifier 633. The first receiving filter 625 and the second receiving filter 635 respectively transmit the corresponding filtered signal components to a signal processing unit 640.

The signal processing unit 640 may process the signal filtered by each of the receive filters 625 and 635 into data. Also, when data to be transmitted from the terminal is inputted, the signal processing unit 640 generates a signal based on the input data.

A first transmission filter 653 and a second transmission filter 663 pass only a desired signal from signals generated in the signal processing unit and attenuate the remaining signals.

According to exemplary embodiments of the present invention, a first frequency band pulse amplitude modulator 655 and a second frequency band pulse amplitude modulator 665 amplify a signal passing through the first filter 653 and the second transmission filter 663, respectively. To this end, the first frequency band pulse amplitude modulator 655 and the second frequency band pulse amplitude modulator 665 may convert a sampled value into a pulse that is proportional to an amplitude of the signal and may transmit the converted signal. Therefore, each signal passing through the first frequency band pulse amplitude modulator 655 and the second frequency band pulse amplitude modulator 665 has a pulse height proportional to an amplitude of an original signal.

The first frequency band duplexer 620 and the second frequency band duplexer 630 separate a signal component of a corresponding frequency band in the signal component amplified by the first frequency band pulse amplitude modulator 655 and the second frequency band pulse amplitude modulator 665 to be transmitted to the antenna 610. Namely, the first frequency band duplexer 620 transmits only a signal component corresponding to a first frequency band to the antenna 610 and the second frequency band duplexer 630 transmits only a signal corresponding to a second frequency band to the antenna 610. Here, a frequency in each frequency band is transmitted to the antenna 610 at the same time.

Figure 7:
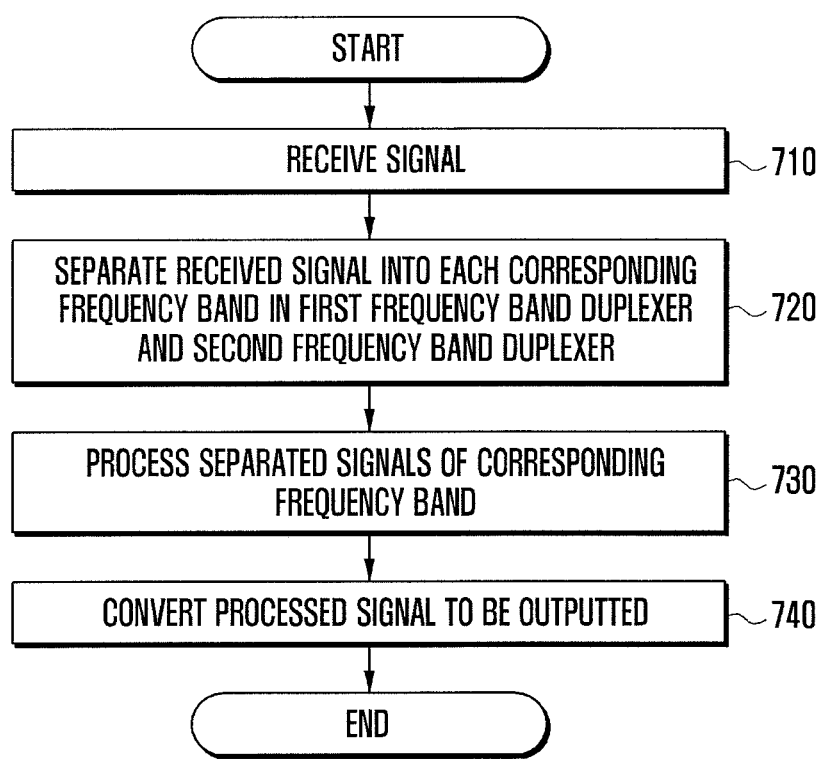
FIG. 7 illustrates a signal receiving method according to an exemplary embodiment of the present invention.

FIG. 7 illustrates a signal receiving method according to an exemplary embodiment of the present invention.

Referring to FIG. 7, when a signal is received through the antenna at step 710, the terminal uses a first frequency band duplexer and a second frequency band duplexer to separate the received signal into frequency bands corresponding to the first frequency band duplexer and the second frequency band duplexer at step 720. Next, the terminal processes the signal components separated into the corresponding frequency band by using respective frequency band low noise amplifiers and filters at step 730. Finally, the terminal converts the signal processed according to each frequency band into a single datum to be outputted at step 740.

According to exemplary embodiments of the present invention, through the above described process, the terminal may process a signal component in a different frequency band, which is subsequently received, into one datum. Next, the terminal can transmit the signal to the base station. To this end, the terminal generates the datum into a signal by using the signal processing unit and filters only a desired signal by using at least two transmission filters. Further, according to exemplary embodiments of the present invention, the filtered signal is passed through the pulse amplitude modulator corresponding to each transmission filter to be power amplified. The power amplified signal passes through each frequency band duplexer corresponding to each pulse amplitude modulator and is passed to an antenna which transmits the signal.

According to exemplary embodiments of the present invention, the base station includes one filter, one pulse amplitude modulator, and at least two duplexers, for signal transmission. The base station can transmit a signal in a different frequency band to the terminal by using a nonlinear harmonic component generated by the pulse amplitude modulator. Also, when a signal is received, the terminal separates the received signal into signal components in respectively different frequency bands by using at least two duplexers. Further, the terminal can process the signal components separated into each frequency band by using a corresponding low noise amplifier and a filter.

According to exemplary embodiments of the present invention, by using a nonlinear harmonic component that is deemed as unwanted in communication systems using MIMO transmission methods according to the related art, the MIMO transmission method can be implemented. In addition, a need for multiple antennas is removed so that the MIMO transmission method can be implemented in a smaller space at a lower cost.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting a signal in a base station, the method comprising:

filtering a signal to be transmitted through a filter;

generating nonlinear harmonic components corresponding to at least two frequency bands by amplifying the filtered signal;

transmitting the nonlinear harmonic components to a first frequency band duplexer and a second frequency band duplexer;

separating, by the first frequency band duplexer, a first nonlinear harmonic component corresponding to a first frequency band from the nonlinear harmonic components, and separating, by the second frequency band duplexer, a second nonlinear harmonic component corresponding to a second frequency band from the nonlinear harmonic components; and transmitting the separated nonlinear harmonic components to an antenna.

2. The method according to claim 1, wherein the transmitting of the separated nonlinear harmonic components comprises:

first transmitting the first nonlinear harmonic component and subsequently transmitting the second nonlinear harmonic component.

3. A base station for transmitting a signal, the base station comprising:

a transmission filter configured to filter a signal to be transmitted by a signal processing unit;

a nonlinear harmonic component generator configured to generate nonlinear harmonic components corresponding to at least two frequency bands by amplifying the filtered signal and to transmit the nonlinear harmonic components to a first frequency band duplexer and a second frequency band duplexer;

the first frequency band duplexer and the second frequency band duplexer configured to separate the nonlinear harmonic components into the first frequency band and the second frequency band; and an antenna configured to receive the separated nonlinear harmonic components.

4. The base station according to claim 3, wherein the first frequency band duplexer is configured to separate a first nonlinear harmonic component corresponding to the first frequency band from the nonlinear harmonic components, and the second frequency band duplexer is configured to separate a second nonlinear harmonic component corresponding to the second frequency band from the nonlinear harmonic components.

5. The base station according to claim 4, wherein the antenna is configured to simultaneously transmit the first nonlinear harmonic component and the second nonlinear harmonic component.

6. The base station according to claim 3, wherein a relationship between the first frequency band and the second frequency band is defined by multiple variables, and the antenna has a dual frequency band component characteristic.

* * * * *